United States Patent [19]

Bicking

[11] Patent Number: 5,469,054
[45] Date of Patent: Nov. 21, 1995

[54] POSITION SENSOR WITH TWO MAGNETICALLY SENSITIVE DEVICES AND TWO TARGET TRACKS WHICH ARE SENSED IN COMBINATION WITH EACH OTHER TO PROVIDE A SYNTHESIZED SIGNAL

[75] Inventor: Robert E. Bicking, Freeport, Ill.

[73] Assignee: Honeywell Inc., Minneapolis, Minn.

[21] Appl. No.: 52,350

[22] Filed: Apr. 22, 1993

[51] Int. Cl.⁶ .................. G01B 7/14; G01B 7/30
[52] U.S. Cl. ............... 324/207.2; 324/207.22; 324/207.23
[58] Field of Search ............. 324/207.2, 207.21, 324/207.22, 207.25, 251, 252, 235, 174

[56] References Cited

U.S. PATENT DOCUMENTS

| | | | |
|---|---|---|---|
| 4,262,251 | 4/1981 | Fujishiro et al. | 324/207.25 |
| 4,329,645 | 5/1982 | Takase | 324/207.25 X |
| 4,533,902 | 8/1985 | Baker et al. | 324/207.25 X |
| 4,535,289 | 8/1985 | Abe et al. | 324/207.21 X |
| 4,551,676 | 11/1985 | Amemiya et al. | 324/207.21 |
| 4,853,632 | 8/1989 | Nagano et al. | 324/207.21 |
| 4,970,463 | 11/1990 | Wolf et al. | 324/207.21 |
| 5,018,384 | 5/1991 | Hayashi et al. | 73/118.1 |
| 5,070,727 | 12/1991 | Davis et al. | 73/116 |
| 5,086,272 | 2/1992 | Henrichsen | 324/207.13 |
| 5,111,138 | 5/1992 | Kramer | 324/174 |
| 5,241,267 | 8/1993 | Gleixner et al. | 324/207.2 |
| 5,304,926 | 4/1994 | Wu | 324/207.2 |

*Primary Examiner*—Sandra L. O'Shea
*Assistant Examiner*—Warren S. Edmonds
*Attorney, Agent, or Firm*—William D. Lanyi

[57] ABSTRACT

A position sensor is provided with two target tracks which each comprise a plurality of magnetic and nonmagnetic segments. Each target track is associated with a magnetically sensitive device such as a Hall effect element. By appropriately positioning the locations of the pluralities of magnetic and nonmagnetic segments, output signals from the magnetically sensitive devices can be caused to generate preselected signal patterns. These signal patterns can be combined to synthesize a third output signal having a signal pattern of a desired characteristic which would otherwise be unobtainable through the use of a single target path configured with magnetic and nonmagnetic segments to directly generate the desired signal pattern.

8 Claims, 5 Drawing Sheets

POSITION SENSOR WITH TWO MAGNETICALLY SENSITIVE DEVICES AND TWO TARGET TRACKS WHICH ARE SENSED IN COMBINATION WITH EACH OTHER TO PROVIDE A SYNTHESIZED SIGNAL

BACKGROUND OF THE INVENTION

1. Field of the Invention

The present invention relates generally to a position sensor and, more particularly, to a position sensor which utilizes two tracks arranged in a side-by-side configuration in which each track comprises a plurality of magnetic and nonmagnetic segments with a magnetically sensitive device disposed proximate to each track.

2. Description of the Prior Art

Many different devices are known to those skilled in the art for detecting the movement of an object relative to the position of a sensor. These devices can utilize photoelectric or magnetic sensors, among many other alternatives, to determine the position, speed and direction of motion of an object.

U.S. Pat. No. 4,853,632, which issued to Nagano et al on Aug. 1, 1989 describes an apparatus for magnetically detecting a position of a moveable magnetic body. It includes a magnetic field intensity sensing structure formed by a pair of magneto resistors. The magnetic field intensity sensing structure is disposed opposite to a magnetic body arranged for movement relative thereto in a magnetic field. It generates a first electrical signal of sinusoidal waveform in response to a change in the intensity of the magnetic field due to the relative movement of the magnetic body. This first electrical signal appears from the apparatus as a second electrical signal of rectangular waveform or sinusoidal waveform having am amplified magnitude.

U.S. Pat. No. 4,970,463, which issued to Wolf et al on Nov. 13, 1990, describes a temperature stable proximity sensor. The ferrous object sensor assembly is capable of sensing the presence or absence of an object of high magnetic permeability, such as a tooth or notch on a rotatable mounted ferrous wheel, at zero speed and immediately upon power-up. The assembly comprises a permanent magnet and a magnetic flux responsive sensor having a sensing plane which produces an electrical output signal which varies as a function of the change of magnetic flux density. The sensor assembly does not rely upon pole face magnetism as some known conventional sensors do but, rather, relies upon the radial component of magnetic flux density emanating from a lateral surface of the magnet intermediate opposing pole faces.

U.S. Pat. No. 5,018,384, which issued to Hayashi et al on May 28, 1991, discloses a rotational speed detector which is incorporated in an antiskid brake system for an automobile. It detects a rotational speed of a wheel. The sensor assembly is provided on either one of the outer and inner rings of a wheel and is biased toward a sensor rotor that is provided on the other of the two rings in such a manner that the sensor assembly is slidable on the sensor rotor. This maintains the distance between the rotational speed sensor assembly and the sensor rotor at a constant level.

U.S. Pat. No. 5,070,727, which issued to Davis et al on Dec. 10, 1991, describes a crank shaft angular position detecting apparatus. The apparatus is used for detecting the angular position of the crank shaft of an internal combustion engine. The crank shaft drives a timing wheel which has a plurality of circumferentially spaced slots located along its outer periphery. Two angularly spaced sensors are located adjacent the slots. The sensors develop voltage pulses as the slits move past the sensors. Two phase displaced pulse trains are developed, one by each sensor, as the wheel rotates. The pattern of slots and the angular spacing of the sensors is such that a varying number of pulses of one pulse train occurs between consecutive occurring pulses of the other pulse train. The varying number of pulses provide different patterns and each pattern in indicative of a crank shaft position.

U.S. Pat. No. 5,086,272, which issued to Henrichsen on Feb. 4, 1992, describes an apparatus for distinguishing between opposed directions of relative motion of a part having magnetic variations. The device contains an inductive magnetic sensor disposed adjacent to the path of motion of the magnetic variations. It has portions with different magnetic couplings with the magnetic variations spaced in the direction of motion of the part.

U.S. Pat. No. 5,111,138, which issued to Kramer on May 5, 1992, describes a speed sensor which has a closed magnetic flux path for sensing speed from an axial space of a rotating member. The sensor utilizes a stator which includes two circumferentially spaced elements which are interconnected by a low magnetic permeability member. The elements have alternating regions which provide a variation in magnetic permeability. A rotor which is arranged for rotation about a rotational axis includes alternating regions of magnetic permeability which interact with the stator. A magnet is located between the elements of the stator and the structural interconnection therebetween. A coil of wire is placed around the structural interconnecting member to sense variations in magnetic field which are caused by the change in reluctance as the respective regions of magnetic permeability of the elements and rotor pass one another.

In position sensing devices which utilize magnetically sensitive devices, such as Hall elements, and rely on changing magnetic field intensities affected by the movement of magnetic material proximate the sensor exhibit certain limitations in particular applications. For example, when a plurality of teeth and interstitial spaces are used as part of the moveable object, the magnetic effect sensed by the magnetically sensitive device can vary significantly as a function of the width of the tooth or slot adjacent to it. In other words, narrow slots cause different magnetic field deviations than wide slots and narrow teeth cause different magnetic field variations than wide teeth. As will be described in greater detail below, these different effects caused by wide and narrow teeth or slots increase the difficulty in using sensors of this type. These problems are exacerbated in circumstances where a large number of teeth and slots are required when the diameter of the moveable object is relatively small. In situations of this type, it is necessary to space the teeth and slots closely together. It would therefore be highly beneficial to the technology of position sensing if a sensing system could distinguish narrow slots from wide slots and narrow teeth from wide teeth with a high degree of confidence and without requiring a large angular movement of the moveable object before being able to determine the position of the object.

SUMMARY OF THE INVENTION

The present invention provides a position sensor which, in a preferred embodiment, comprises a first target and a second target. The first and second targets each comprise a plurality of magnetic and nonmagnetic segments which are aligned to define first and second target paths, respectively. A first magnetically sensitive device, such as a Hall element, is disposed proximate the first path and has a first output signal that is representative of the magnetic characteristic of a most proximate one of the first plurality of magnetic and nonmagnetic segments. A second magnetically sensitive device is disposed proximate the second path and has a second output signal which is representative of the magnetic characteristic of a most proximate one of the second plurality of magnetic and nonmagnetic segments. A preferred embodiment of the present invention also comprises a means for providing a third output signal which is derived as a function of the first and second output signals. The first and second pluralities of magnetic and nonmagnetic segments are arranged to cause the third output signal to provide a preselected signal pattern.

By utilizing first and second target paths and by appropriately positioning the magnetic and nonmagnetic segments of the two paths relative to each other, the two target paths can cause first and second output signals to be generated by related magnetically sensitive devices. These two signals can be generated in such a way that they can be combined to result in a third output signal that is synthetically produced in a preselected pattern. The third output signal can be constructed to simulate the passage of very narrow teeth or slots past a single sensor even though the actual physical sensing of those very narrow teeth or slots would otherwise be physically impossible or extremely difficult to achieve.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 2:
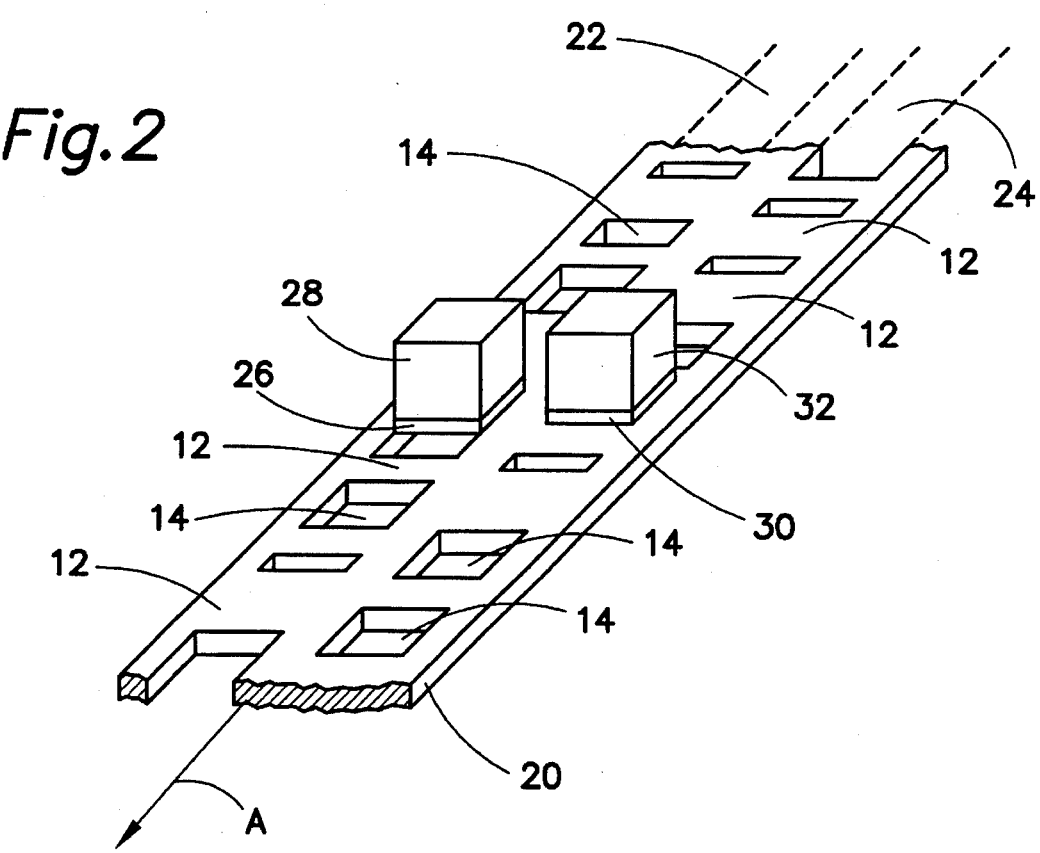
FIG. 2 shows a moveable object and two sensors configured according to the present invention.

Throughout the Description of the Preferred Embodiment of the present invention, like components will be identified by like reference numerals.

Figure 1:
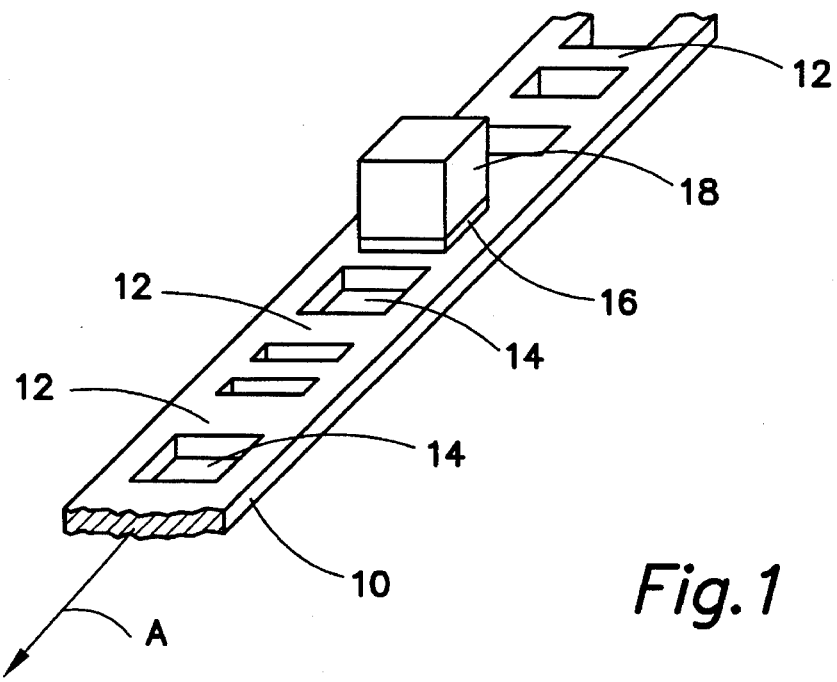
FIG. 1 shows a system known to those skilled in the art.

FIG. 1 shows a known concept for sensing the movement of an object. The moveable object 10 is provided with a plurality of magnetic segments 12 and a plurality of nonmagnetic segments 14. A magnetically sensitive device 16, such as a Hall element, is disposed proximate the path of the moveable object 10 which is represented by arrow A. A permanent magnet 18 is associated with the magnetically sensitive device 16 to create a bias magnetic field which affects the output signal of the magnetically sensitive device 16. As the magnetic and nonmagnetic segments of the moveable object 10 move past a preselected zone proximate the magnetically sensitive device as indicated by arrow A, the output signal from the device changes and can be detected. By appropriately monitoring the magnitude of the output signal from the magnetically sensitive device 16, it can be determined whether a magnetic or a nonmagnetic segment is proximate the detection zone. By appropriately selecting the sizes of the magnetic and nonmagnetic segments, signals from the magnetically sensitive device 16 can be used to accurately determine the position, speed and direction of travel of the object 10.

With continued reference to FIG. 1, it can be seen that the sizes of the magnetic and nonmagnetic segments, 12 and 14, vary significantly from one another. In other words, relatively narrow nonmagnetic segments 14 are interspersed with relatively wide nonmagnetic segments 14. Similarly, narrow magnetic segments 12, or teeth, are interspersed with wider magnetic segments. As will be described in greater detail below in conjunction with FIG. 3, certain portions of a target path such as that shown in FIG. 1 can create severe difficulties in monitoring the motion, speed and position of a moveable object.

FIG. 2 illustrates a schematic representation of a moveable object 20 made in accordance with the present invention. Two target paths, which are identified by reference numerals 22 and 24, are disposed within the object 20. Each target path comprises a plurality of magnetic segments 12 and nonmagnetics 14. The first target track, or path, is identified by reference numeral 22 and is associated with a magnetically sensitive device 26 which, in turn, is arranged proximate a permanent magnet 28. A second magnetically sensitive device 30 is associated with another permanent magnet 32 and is disposed proximate the second target path 24. In the manner described above in conjunction with FIG. 1, each of the magnetically sensitive devices, 26 and 30, provides an output signal that represents the presence of a magnetic or a nonmagnetic segment in its detection zone. The magnetically sensitive devices are not affected by the magnetic and nonmagnetic segments of the other path although this magnetic independence is not a requirement of all embodiments of the present invention.

With continued reference to FIG. 2, it can be seen that each of the two target paths, 22 and 24, comprise magnetic segments of different sizes and nonmagnetic segments of different sizes. In other words, each target path comprises narrow teeth, wide teeth, narrow slots and wide slots.

Figure 3:
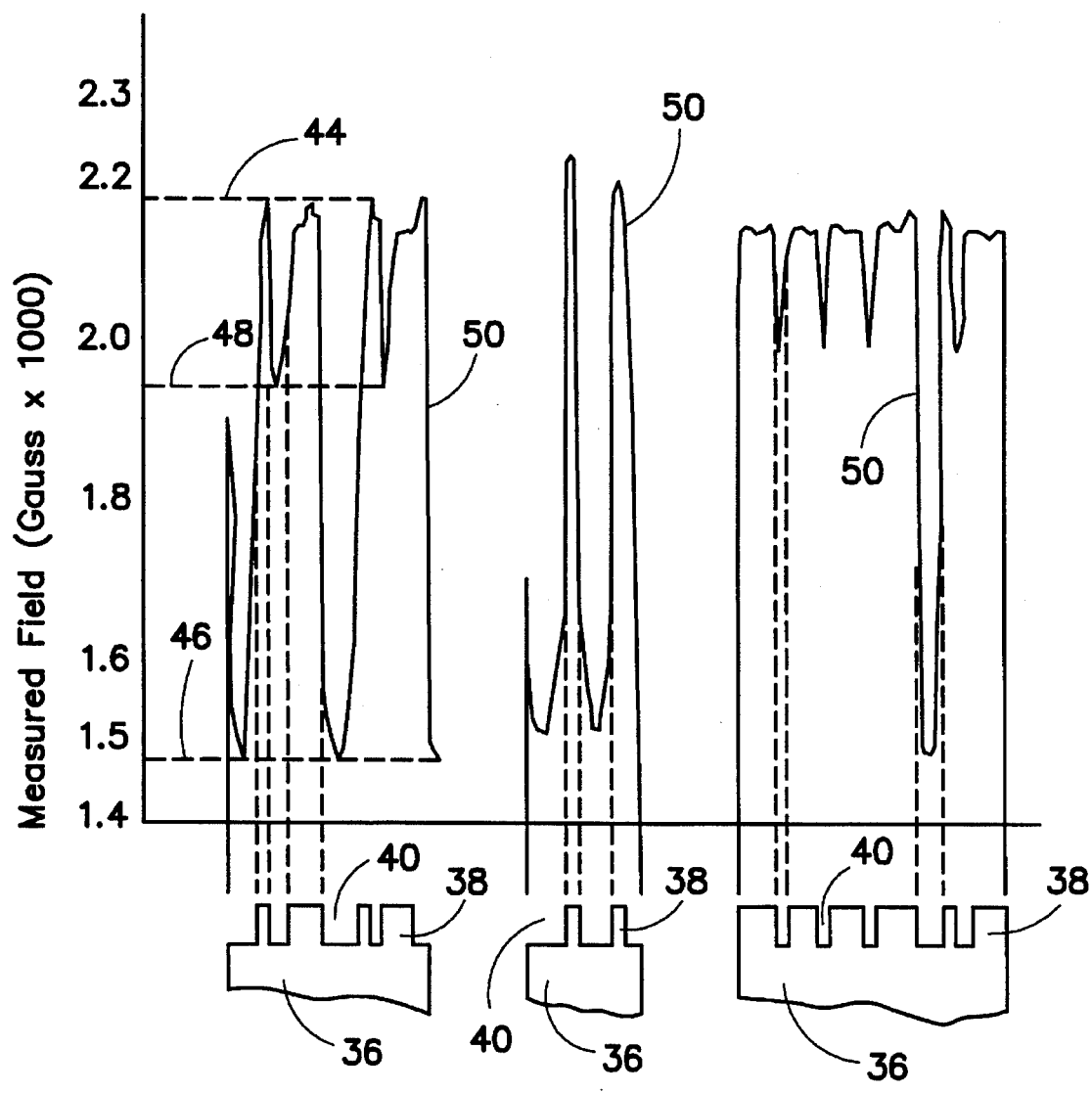
FIG. 3 illustrates the magnetic field strength at a sensor as a function of the target in its detection zone.

FIG. 3 is a graphical representation of the intensity of magnetic field shown as a function of the magnetic or nonmagnetic object most proximate the detection zone of a magnetically sensitive device, such as a Hall effect element. In the schematic representation of FIG. 3, segments of a moveable object 36 are shown along one axis. The object 36 comprises various teeth 38 and slots 40. It should be understood that the present invention is operable with moveable objects that comprise teeth and slots that extend radially from a rotatable member, similar to the teeth of a gear, or with magnetic and nonmagnetic segments of a moveable object that utilize openings formed through magnetic material and interstitial teeth such as the arrangements illustrated in FIGS. 1 and 2. If a magnetically sensitive device is back-biased by a permanent magnet of appropriate magnetic strength, the variations in output signal from the magnetically sensitive device will respond to the intensity of the magnetic field directed perpendicularly through the device. This measured field intensity, in thousands of Gauss, varies in response to the passage of an object 36 through the detection zone as illustrated in FIG. 3. When a tooth 38 is within the detection zone, the measured magnetic field rises significantly to a magnitude of approximately 2,200 Gauss as represented by dashed line 44. It can be seen that although the width of the signal varies according to the width of the tooth 38, the intensity of the signal is relatively consistent for both narrow and wide teeth.

With continued reference to FIG. 3, it can be seen that the passage of a slot 40 through the detection zone of a sensor causes the magnitude of the magnetic field to decrease. If a wide slot 40 passes through the detection zone, the magnitude of the magnetic field decreases to approximately 1,500 Gauss, as represented by dashed line 46. When a narrow slot 40 passes through the detection zone, the decrease in magnetic field intensity is much less severe, as indicated by the decrease in the signal to a value of approximately 1,950 Gauss which is represented by dashed line 48. Although the variations of the strength of signal 50 is representative of one particular experimental procedure with the sensor being disposed approximately 0.020 inches from the passing teeth, it should be understood that FIG. 3 represents the general problem associated with the detection of both narrow and wide slots. This problem is significantly worse if the moveable object can vary in position from the sensor, as a result of the normal tolerances experienced during manufacturing and assembly. The decreased variation, from line 44 to line 48, caused by the passage of a narrow slot through the detection zone, makes it very difficult to distinguish between the passage of a narrow slot and the passage of a wide slot. Although the causes of the problems described in conjunction with FIG. 3 are difficult to define, it is theorized that the decreased change in magnetic flux caused by the passage of a narrow slot through the detection zone is caused by the existence of a fringing magnetic field around the edges of the slot. In other words, the presence of magnetically permeable material, or teeth, closely proximate both sides of a narrow slot tends to cause the magnetic field to fringe and extend into the narrow slot. If the slot is wide, this fringing effect is minimal, but if the slot is narrow the effect is significant in comparison to the portion of the slot remaining between the zones into which the magnetic field fringes. Regardless of the precise cause of the effect shown in FIG. 3, it presents a significant problem when narrow slots are required because of the necessity of providing a large number of teeth and slots in a relatively small moveable object.

Figure 4:
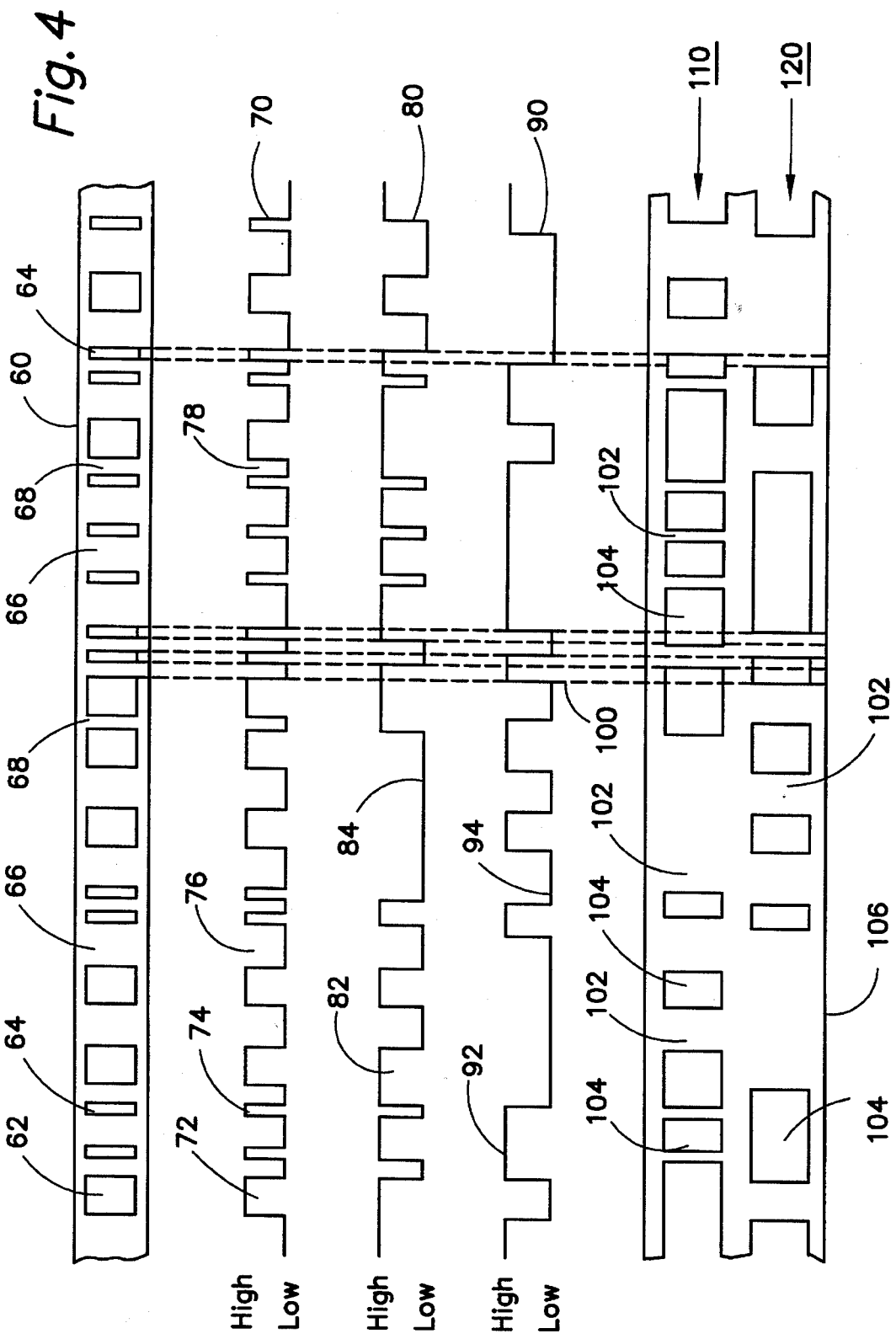
FIG. 4 shows one implementation of the present invention.

FIG. 4 illustrates a hypothetical desired target, the problems in implementing that target and the way in which the present invention allows that preselected target to be simulated by the creation of synthetic signal as a function of two actual signals caused by two particularly designed target paths. In FIG. 4, reference numeral 60 is used to identify a hypothetical target that is desired for use in sensing the position of a moveable object. The target 60 comprises wide slots 62 and narrow slots 64. In addition, the target 60 comprises wide teeth 66 and narrow teeth 68. The purpose for having a target 60 configured in the manner shown in FIG. 4 is to satisfy the need for generating a signal pattern such as that identified by reference numeral 70. As can be seen by comparing signal pattern 70 with target 60, wide slots 62 generate wide pulses 72 and narrow slots 64 generate narrow pulses 74. Similarly, wide teeth 66 generate wide low signals 76 between pulses and narrow teeth 68 generate narrow low signals 78 between pulses. If the width of the narrow slots 64 are sufficiently small, signal 70 will be impossible to create because of the magnetic flux fringing described above in conjunction with FIG. 3. The changes in magnetic intensity caused by the narrow slots 64 will be insufficient to be detected by the magnetically sensitive device, such as a Hall effect element. In other words, with reference to FIG. 3, the distance between dashed lines 44 and 48 will be decreased to a magnitude that would make the detection of a narrow slot extremely difficult. For purposes of reference, it will be assumed that the width of the narrow slot 64 is approximately 0.100 inches wide and the width of a wide slot 62 is approximately 0.400 inches wide. Similarly, in this hypothetical representation of FIG. 4, the narrow teeth 68 will be presumed to be approximately 0.100 inches wide and the wide teeth 66 will be presumed to be approximately 0.400 inches wide. The precise absolute dimensions of the teeth and slots are not critically important to this description, but they are described to illustrate the advantage of the present invention that the relative dimensions of the teeth and slots of the present invention be understood.

With continued reference to FIG. 4, it should be understood that the signal pattern 70 could be synthetically created if two other signal patterns, 80 and 90, are created and combined together as inputs to an exclusive-or device. The output of the exclusive-or device would be signal pattern 70. By utilizing two signal patterns to generate a third signal pattern, the present invention permits the simulation of signal pattern 70 by signal patterns 80 and 90. With particular reference to the five dashed lines identified by reference numeral 100, it can be seen that two narrow pulses of signal pattern 70 are required at that location. This would normally require two narrow slots 64 to generate those signals. However, as described above, the use of narrow slots causes the fringing problem that distorts the magnitude of magnetic field strength that is sensed by the magnetically sensitive device. For this reason, narrow slots 64 should be avoided. With continued reference to region 100 in FIG. 4, it can be seen that signal patterns 80 and 90 do not include pulses, or low signals between pulses, that are as narrow as those in region 100 for signal pattern 70. This is true because the two wider signals of signal patterns 80 and 90 in region 100 are arranged so that they combine, in an exclusive-or manner, to result in the two narrow pulses of signal pattern 70 within region 100.

By comparing signal patterns 70, 80 and 90, it can be seen that no pulses, 82 or 92, are required in signal patterns 80 or 90 are required to be extremely narrow to generate the plurality of narrow pulses 74 in signal pattern 70 if exclusive-or logic is used. Although signal pattern 80 comprises several narrow low signal portions between pulses, it comprises no extremely narrow high signal pulses.

Once the two signal patterns, 80 and 90, are determined so that they combine appropriately to synthesize signal pattern 70, the target tracks and moveable object of the present invention can be constructed. The moveable object 106 shown in FIG. 4 comprises two target tracks, 110 and 120. In the manner described in detail above, each target track comprises a plurality of magnetic and nonmagnetic segments. The magnetic segments 102 are interspersed with nonmagnetic segments 104. Similarly, the second target track 120 comprises a plurality of magnetic segments 102 and nonmagnetic segments 104. Although the sizes of the magnetic and nonmagnetic segments of the first and second target tracks, 110 and 120, vary significantly, it should be noted that no slot, or nonmagnetic segment 104, is as small as the narrow slots shown in object 60 in FIG. 4. More specifically, no slot in moveable object 106 is less than 0.200 inches wide, which is twice the width of the narrow slots 64. This criterion was selected for purposes of illustrating an exemplary embodiment of the present invention and it should be understood that the precise magnitude of the slot width is not a functional of the present invention. Instead, the present invention provides a means by which the slot dimensions can be enlarged so that the magnetic field fringing problem described above can be diminished.

Figure 5:
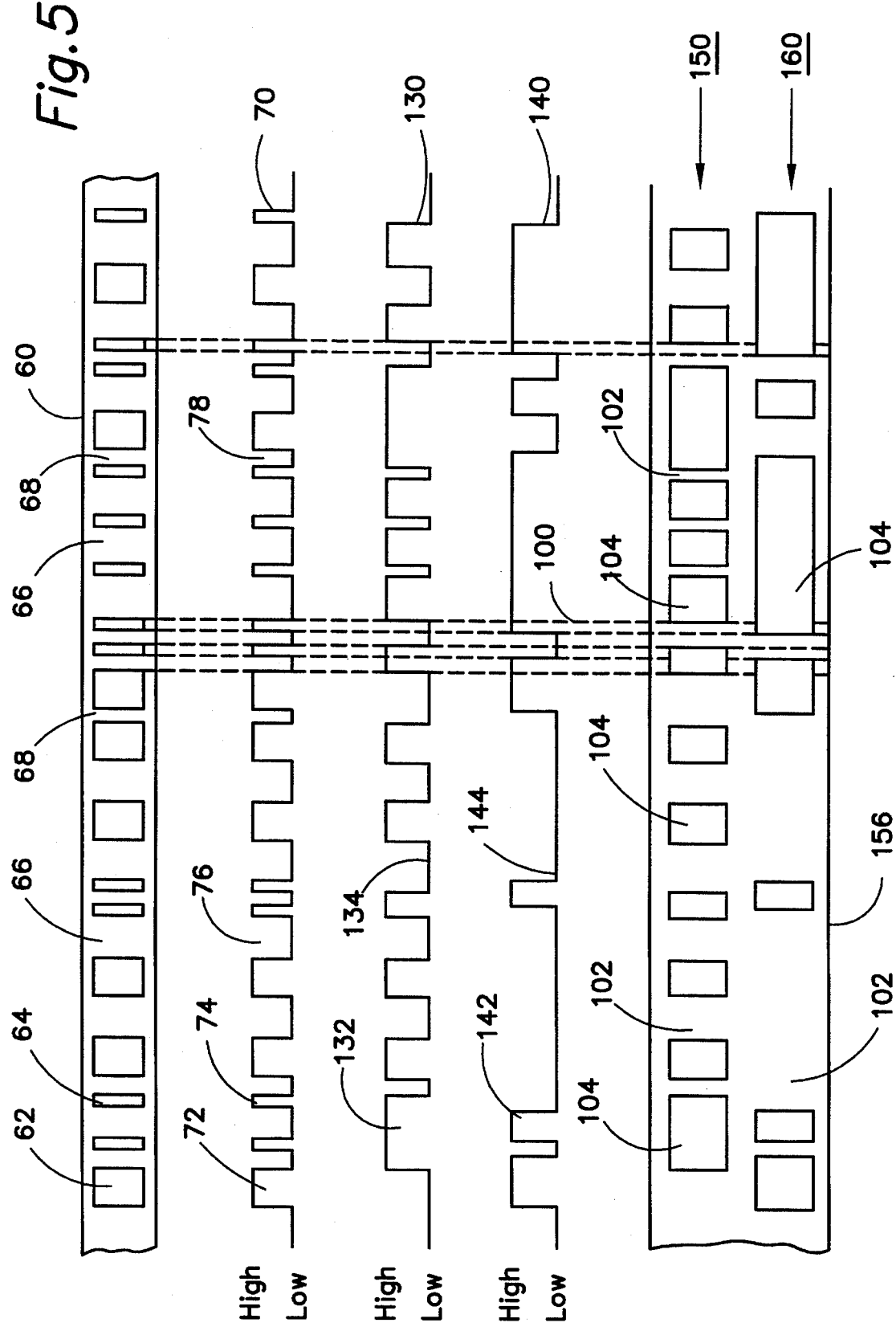
FIG. 5 shows an alternative implementation of the present invention.

With continued reference to FIG. 4, it should be understood that the embodiment of the present invention identified by reference numerals 106, with tracks 110 and 120, is not the only embodiment that solves the problem described above. To illustrate this flexibility, FIG. 5 shows the moveable object 60 and signal pattern 70 of FIG. 4 reproduced for purposes of this example. The same narrow pulses 74 and wide pulses 72 are shown in FIG. 5 as they are in FIG. 4. Additionally, the same narrow low signals 78 between pulses and the same wide low signals 76 between pulses are illustrated. This signal pattern 70 in FIG. 5 would normally necessitate the target configuration of moveable object 60 illustrated above it in FIG. 5. In other words, the problem presented in FIG. 5 is identical to the problem presented and described above in conjunction with FIG. 4.

Signal patterns 130 and 140 can be combined with exclusive-or logic to result in signal pattern 70. Although signal patterns 130 and 140 can be used in this way to synthesize signal pattern 70, it can be seen that they are significantly different than signal patterns 80 and 90 which can also be used to synthesize signal 70. To achieve signal patterns 130 and 140, the moveable object 156 is constructed as shown in FIG. 5 with target tracks 150 and 160 each comprising a plurality of magnetic segments 102 and nonmagnetic segments 104. Target track 150 provides the signal pattern 130 and target track 160 provides the signal pattern 140 in a manner similar to that described above in conjunction with FIG. 4, wherein target track 110 provided signal pattern 80 and target track 120 provided signal pattern 90.

By comparing FIGS. 4 and 5, it can be seen that moveable object 106 and moveable object 156 are significantly different from each other in the arrangement of magnetic and nonmagnetic segments. In addition, the generated signals 130 and 140 are significantly different than generated signals 80 and 90. However, through the use of exclusive-or logic, the synthesized signal pattern 70 is identical in both cases. Although FIGS. 4 and 5 illustrate two possible embodiments of the present invention, it should be understood that many different embodiments are within its scope. All embodiments of the present invention have the common characteristic that two target tracks, or paths, are provided so that the resulting output signals from associated magnetically sensitive devices can be combined to synthetically produce an output signal pattern representing a target track that would otherwise be virtually impossible to construct and operate. The nonmagnetic segments of the target tracks in the present invention are wider than would be possible if the signal combination techniques were not employed. By providing two associated target tracks with wider slots, the magnetic field fringing problem associated with narrow slots is alleviated even though the desired output signal pattern is achieved.

Figure 6:
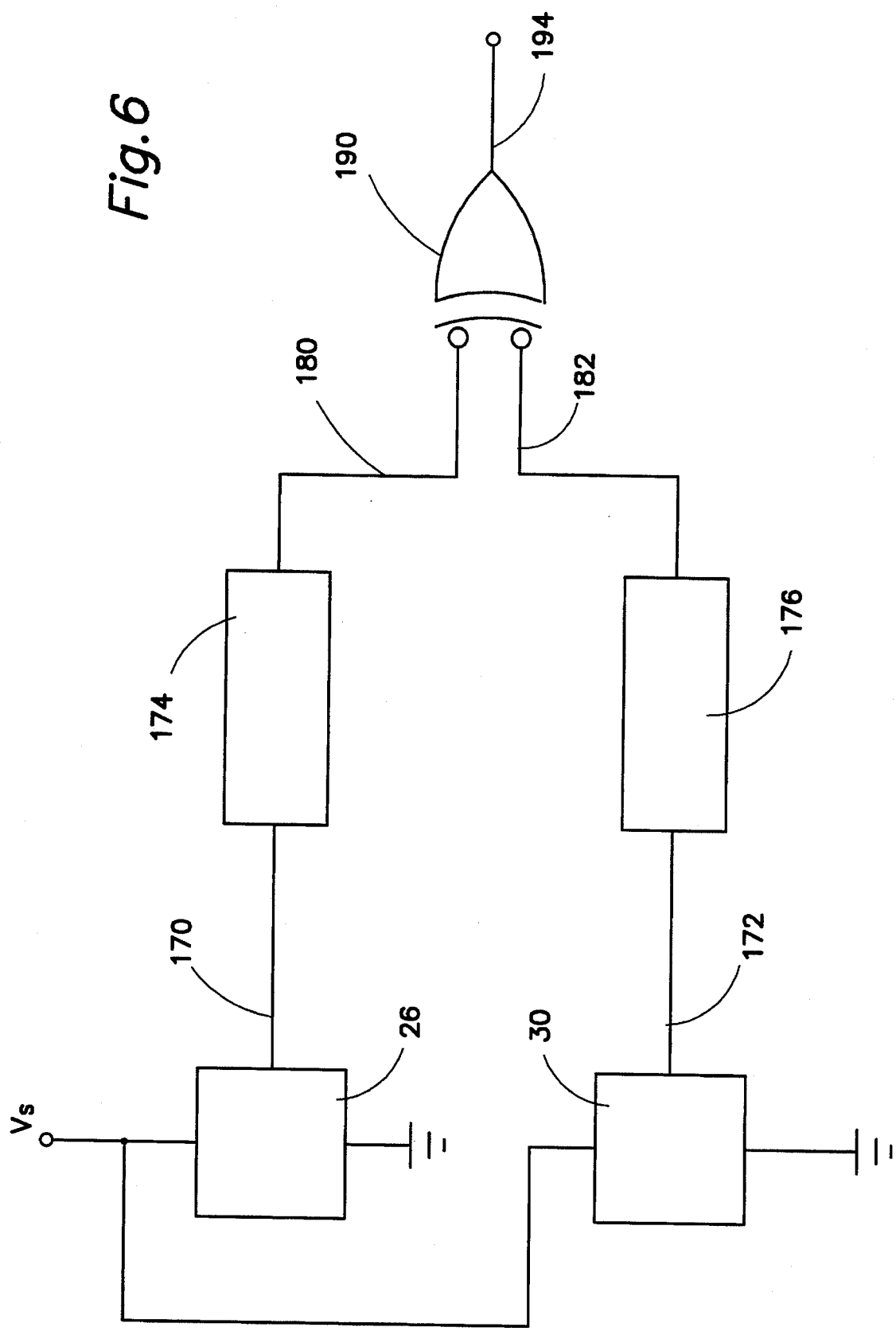
FIG. 6 shows an exemplary circuit used in association with the preferred embodiment of the present invention.

FIG. 6 illustrates an exemplary electronic circuit that can be used in association with two magnetically sensitive devices to achieve the results described above. First and second magnetically sensitive devices, 26 and 30, are provided with power at a preselected voltage $V_s$. The output signals of the two magnetically sensitive devices are provided on lines 170 and 172, respectively, and these signals are can be amplified by appropriate amplification devices 174 and 176. The amplified signals are provided on lines 180 and 182 to the inverted inputs of an exclusive-or device 190. The output from the exclusive-or device is provided on line 194. If desired for a particular application, the amplification devices, 174 and 176, can be combined with appropriate circuitry to compare the output signals from the magnetically sensitive devices, 26 and 30, to threshold magnitudes to provide pulses with uniform magnitudes and more vertical rise and fall characteristics. Depending on the shapes of the signals on lines 170 and 172, the signal shaping circuitry may or may not be needed.

With continued reference to FIG. 6, it should be understood that the magnetically sensitive devices, 26 and 30, can be Hall effect devices. It should also be understood that the signal patterns on lines 180 and 182 would be signal patterns 80 and 90 or, alternatively, signal patterns 130 and 140. The resulting synthesized signal of line 194 would be signal pattern 70.

Although the present invention has been described with particular detail and illustrated to show two specific alternative embodiments of the present invention, it should be understood that alternative embodiments are within its scope.

The embodiments of the invention in which an exclusive property or right is claimed are defined as follows:

1. A position sensor, comprising:

a first target comprising a first plurality of ferromagnetic and nonferromagnetic segments aligned to define a first path, said first plurality of ferromagnetic and nonferromagnetic segments comprising ferromagnetic segments of unequal dimensions along said first path and nonferromagnetic segments of unequal dimensions along said first path;

a second target comprising a second plurality of ferromagnetic and nonferromagnetic segments aligned to define a second path, said second plurality of ferromagnetic and nonferromagnetic segments comprising ferromagnetic segments of unequal dimensions along said first path and nonferromagnetic segments of unequal dimensions along said first path;

a first magnetically sensitive device, disposed proximate said first path, having a first output signal representative of the magnetic characteristic of a most proximate one of said first plurality of ferromagnetic and nonferromagnetic segments, said first output signal having high and low magnitudes which represent the presence and absence of said ferromagnetic segments proximate said first magnetically sensitive device;

a second magnetically sensitive device, disposed proximate said second path, having a second output signal representative of the magnetic characteristic of a most proximate one of said second plurality of ferromagnetic and nonferromagnetic segments, said second output signal having high and low magnitudes which represent the presence and absence of said ferromagnetic segments proximate said second magnetically sensitive device;

means for providing a third output signal as a function of said first and second output signals, said first and second pluralities of ferromagnetic and nonferromagnetic segments being arranged to cause said third output signal to provide a preselected signal pattern, said preselected signal pattern comprising a plurality of high and low magnitudes that are the result of an EXCLUSIVE-OR combination of the high and low magnitudes of said first and second signal, each of said high and low magnitudes of said third output signal being the direct result of the instantaneous magnitude of the high and low magnitudes of said first and second output signals and independent of previous magnitudes of said high and low magnitudes of said first and second output signals caused by said ferromagnetic and nonferromagnetic segments of said first and second targets not currently proximate said first or second magnetically sensitive devices.

2. The sensor of claim 1, wherein:

said first and second paths are disposed on a rotatable member.

3. The sensor of claim 1, wherein:

said first and second magnetically sensitive devices comprise Hall effect elements.

4. The sensor of claim 1, wherein:

said ferromagnetic segments are teeth of a gear.

5. The sensor of claim 4, wherein:

said nonferromagnetic segments are interstitial spaces between said teeth of said gear.

6. The sensor of claim 1, wherein:

said first and second targets are attached to a generally circular member for rotation about an axis.

7. The sensor of claim 6, wherein:

said circular member is a gear.

8. The sensor of claim 6, wherein:

said circular member is attached to a rotatable shaft of an internal combustion engine.

* * * * *